United States Patent
Toshev et al.

(10) Patent No.: US 12,061,481 B2
(45) Date of Patent: Aug. 13, 2024

(54) ROBOT NAVIGATION USING A HIGH-LEVEL POLICY MODEL AND A TRAINED LOW-LEVEL POLICY MODEL

(71) Applicant: GOOGLE LLC, Mountain View, CA (US)

(72) Inventors: Alexander Toshev, San Francisco, CA (US); Marek Fiser, Mountain View, CA (US); Ayzaan Wahid, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 550 days.

(21) Appl. No.: 17/291,540

(22) PCT Filed: Nov. 27, 2019

(86) PCT No.: PCT/US2019/063639
§ 371 (c)(1),
(2) Date: May 5, 2021

(87) PCT Pub. No.: WO2020/113027
PCT Pub. Date: Jun. 4, 2020

(65) Prior Publication Data
US 2021/0397195 A1    Dec. 23, 2021

Related U.S. Application Data

(60) Provisional application No. 62/772,490, filed on Nov. 28, 2018, provisional application No. 62/772,918, filed on Nov. 29, 2018.

(51) Int. Cl.
G05D 1/02    (2020.01)
G05D 1/00    (2006.01)

(52) U.S. Cl.
CPC .................................. *G05D 1/0221* (2013.01)

(58) Field of Classification Search
CPC ........ G06N 3/006; G06N 3/044; G06N 3/045; G06N 3/084; G05B 2219/39271;
(Continued)

(56) References Cited

U.S. PATENT DOCUMENTS 9,050,719 B2 * 6/2015 Valpola .................. B25J 13/085
10,796,204 B2 * 10/2020 Rohani .................. B25J 9/1697
(Continued)

FOREIGN PATENT DOCUMENTS

CN    102437601    5/2012
DE    202016004627    9/2016

OTHER PUBLICATIONS

Levy, A. et al., "Hierarchical Actor-Critic;" Cornell University, arXiv.org, arXiv:1712.00948v3; 10 pages; Feb. 28, 2018.
(Continued)

*Primary Examiner* — Adam R Mott
*Assistant Examiner* — Sagar Kc
(74) *Attorney, Agent, or Firm* — Gray Ice Higdon

(57) ABSTRACT

Training and/or using both a high-level policy model and a low-level policy model for mobile robot navigation. High-level output generated using the high-level policy model at each iteration indicates a corresponding high-level action for robot movement in navigating to the navigation target. The low-level output generated at each iteration is based on the determined corresponding high-level action for that iteration, and is based on observation(s) for that iteration. The low-level policy model is trained to generate low-level output that defines low-level action(s) that define robot movement more granularly than the high-level action—and to generate low-level action(s) that avoid obstacles and/or that are efficient (e.g., distance and/or time efficiency).

18 Claims, 6 Drawing Sheets

(58) Field of Classification Search
CPC .......... G05B 2219/39289; B25J 9/1602; B25J 9/1656; G05D 1/0221
See application file for complete search history.

(56) References Cited

U.S. PATENT DOCUMENTS

| | | | |
|---|---|---|---|
| 2002/0062156 A1* | 5/2002 | Yamakawa | G05B 13/0265 700/13 |
| 2014/0277718 A1* | 9/2014 | Izhikevich | B25J 9/163 700/250 |
| 2014/0371907 A1* | 12/2014 | Passot | G06N 3/008 700/257 |
| 2018/0247160 A1 | 8/2018 | Rohani et al. | |
| 2018/0311817 A1 | 11/2018 | Laurent et al. | |
| 2018/0319015 A1* | 11/2018 | Sinyavskiy | G06N 3/00 |
| 2020/0114506 A1* | 4/2020 | Toshev | G05B 13/027 |

OTHER PUBLICATIONS

European Patent Office; Invitation to Pay Additional Fees, PCT Application No. PCT/US2019/063639; 22 pages; Mar. 26, 2020.
European Patent Office; International Search Report and Written Opinion of PCT Ser. No. PCT/US2019/063639; 28 pages; dated Jul. 9, 2020.
Chiang, HT L. et al. "Learning Navigation Behaviors End to End;" Cornell University; arXiv.org; arXiv:1809.10124v1; 9 pages; Sep. 26, 2018.
Faust, A. et al., "PRM-RL: Long-range Robotic Navigation Tasks by Combining Reinforcement Learning and Sampling-based Planning;" In Proceedings of IEEE International Conference on Robotic and Automation (ICRA); 9 pages; 2018.
Hochreiter et al. "Long Short-Term Memory." Neural computation 9, No. 8 (1997): pp. 1735-1780. 1997.
He, K. et al., "Deep Residual Learning for Image Recognition;" Proceedings of the IEEE Conference on Computer Vision and Patter Recognition (CVPR); pp. 770-778, 2016.
Kingma et al., Adam: A method for Stochastic Optimization. International Conference on Learning. 2015.
Ross, S. et al., "A Reduction of Imitation Learning and Structured Prediction to No-Regret Online Learning;" in Proceedings of the 14th International Conference on Artificial Intelligence and Statistics (AISTATS); pp. 627-635; 2011.
Lillicrap et al. "Continuous Control with Deep Reinforcement Learning;" International Conference on Learning Representations; 14 pages; 2016.
Bonin-Font, F. et al., "Visual Navigation for Mobile Robots: a Survey," Journal of Intelligent and Robotic Systems, vol. 53, No. 3; 26 pages, 2008.
Mousavian, A. et al., "Visual Representations for Semantic Target Driven Navigation," International Conference on Robotics and Automation (ICRA); 7 pages; May 2019.
DeSouza, G. et al., "Vision for Mobile Robot Navigation: A survey," IEEE Transactions on Pattern and Machine Intelligence, vol. 24, No. 2, pp. 237-267; Feb. 2002.
Armeni, I. et al., "3D Semantic Parsing of Large-Scale Indoor Spaces;" in IEEE Conference on Computer Vision and Pattern Recognition (CVPR); pp. 1534-1543; Jun. 2016.
Mirowski, P. et al., "Learning to Navigate in Complex Environments;" in International Conference on Learning Representations (ICLR); 16 pages; 2017.

Zhu, Y. et al., "Target-driven Visual Navigation in Indoor Scenes using Deep Reinforcement Learning;" in IEEE International Conference on Robotics and Automation (ICRA); pp. 3357-3364; May 2017.
Tai, L. et al., "Virtual-to-real Deep Reinforcement Learning: Continuous Control of Mobile Robots for Mapless Navigation;" in IEEE/RSJ International Conference on Intelligent Robots and Systems (IROS); 6 pages; Sep. 2017.
Savva, M. et al., "MINOS: Multimodal Indoor Simulator for Navigation in Complex Environments;" arXiv.org; arXiv:1712.03931v1; 14 pages; Dec. 11, 2017.
Gupta, S. et al., "Cognitive Mapping and Planning for Visual Navigation;" in IEEE Conference on Computer Vision and Pattern Recognition (CVPR); pp. 2616-2625; 2017.
Wu, Y. et al., "Building Generalizable Agents with a Realistic and Rich 3D Environment," in International Conference on Learning Representations (ICLR); 15 pages; 2018.
Mirowski, P. et al., "Learning to Navigate in Cities Without a Map;" arXiv.org; arXiv:1804.00168v2; 13 pages; Apr. 17, 2018.
Bruce, J. et al., "Learning Deployable Navigation Policies at Kilometer Scale from a Single Traversal;" Conference on Robot Learning (CoRL); 16 pages; 2018.
Bruce, J. et al., "One-Shot Reinforcement Learning for Robot Navigation with Interactive Replay;" arXiv.org; arXiv:1711.10137v2; 10 pages; Nov. 29, 2017.
Savinov, N. et al., "Semi-parametric Topological Memory for Navigation," in International Conference of Learning Representations (ICLR); 16 pages; 2018.
Zhang, J. et al., "Neural SLAM: Learning to Explore with External Memory;" arXiv.org; arXiv:1706.09520v7; 9 pages; Dec. 30, 2020.
Parisotto, E. et al., "Neural Map: Structured Memory for Deep Reinforcement Learning;" arXiv.org; arXiv:1702.08360v1; 13 pages; Feb. 27, 2017.
Oh, J. et al., "Control of Memory, Active Perception, and Action in Minecraft;" in International Conference on Machine earning (ICML); 10 pages; 2016.
Khan, A. et al., "Memory Augmented Control Networks;" in International Conference on Learning Representations (ICLR); 19 pages; 2018.
Dosovitskiy, A. et al., "CARLA: An Open Urban Driving Simulator;" in Conference on Robot Learning (CoRL); 16 pages; 2017.
Ammirato, P. et al., "A Dataset for Developing and Benchmarking Active Vision;" in IEEE International Conference on Robotics and Automation (ICRA); 8 pages; 2017.
Armeni, I. et al., "Joint 2D-3D-Semantic Data for Indoor Scene Understanding;" arXiv.org; arXiv:1702.01105v2; 9 pages; Apr. 6, 2017.
Chang, A. et al., "Matterport3D: Learning from RGB-D Data in Indoor Environments;" IEEE International Conference on 3D Vision (3DV); pp. 667-676; 2017.
Xia, F. et al., "Gibson Env: Real-World Perception for Embodied Agents," in IEEE Conference on Computer Vision and Pattern Recognition (CVPR); pp. 9068-9079; 2018.
Quigley, M. et al., "ROS: An open-source Robot Operating System," in International Conference on Robotics and Automation (ICRA) Workshop on Open Source Software; Kobe, Japan; 6 pages; 2009.
Horgan, D. et al., "Distributed Prioritized Experience Replay," in International Conference on Robotics and Automation (ICRA); 19 pages; 2018.
European Patent Office; Intention to Grant issued in Application No. 19827951.5; 48 pages; dated Mar. 7, 2023.
Chinese Patent Office; First Office Action issued in Application No. 201980078868.4; 34 pages; dated Jun. 6, 2024.

* cited by examiner

ROBOT NAVIGATION USING A HIGH-LEVEL POLICY MODEL AND A TRAINED LOW-LEVEL POLICY MODEL

BACKGROUND

Robot navigation is one of the fundamental challenges in robotics. To operate effectively, various mobile robots require robust navigation in dynamic environments. Robot navigation is often defined as finding a path from a start location to a target location, and executing the path in a robust and safe manner. Typically, robot navigation requires a robot to perceive its environment, localize itself with respect to a target, reason about obstacles in its immediate vicinity, and also reason about a long range path to the target.

Traditionally, robot navigation systems rely on feature extraction and geometric based reasoning to localize a robot and map its environment. When a map of a robot's environment is generated or given, the robot can use the map to find a navigation path using planning algorithms.

Recently, training neural network policy models using reinforcement learning (RL) has emerged as an option for robot navigation. Policy models trained using reinforcement learning in view of robot experience data learn to associate raw observations with actions, without needing mapping or explicit path planning. However, various current policy models trained using RL have been difficult to successfully deploy on real robots. The difficulties can be due to, for example, the high sample complexity of RL algorithms. Such high sample complexities mean that neural network policy models can often only be successfully trained in simulation environments. The neural network policy models trained in simulation environments can fail and/or perform poorly when implemented on real robots. This can be due to, for example, images and/or other observation data captured by real sensors of the real robots varying visually from the simulated observation data utilized to train the neural network policy models.

SUMMARY

Implementations disclosed herein are directed to training and/or using both a high-level policy model and a low-level policy model for mobile robot navigation. For example, the high-level policy model and low-level policy model can be cooperatively utilized to perform point-to-point navigation in which a mobile robot navigates from a current pose to a navigation target in an environment, such as a particular location in the environment, a particular object in the environment, or other navigation target in the environment. The high-level policy model and the low-level policy model can each be a machine learning model, such as a neural network model. In various implementations, the high-level policy model is a recurrent neural network (RNN) model and/or the low-level policy model is a feed forward neural network model, such as a convolutional neural network (CNN) model.

The high-level policy model is used to generate, based on a target label for a navigation target and based on current robot observation(s) (e.g., observation data), high-level output that indicates which of a plurality of discrete high-level actions should be implemented to reach the navigation target in view of the current robot observations. As one non-limiting example, the high-level actions can include "go forward", "turn right", and "turn left". The low-level policy model is used to generate, based on current robot observation(s) (that can optionally differ from those utilized in generating the high-level output) and optionally based on a high-level action selected based on the high-level output, low-level action output. The low-level action output defines a low-level action that defines robot movement more granularly than does the high-level action. As one non-limiting example, the low-level action can define a corresponding angular velocity and a corresponding linear velocity for each of one or more wheels of a mobile robot. The low-level action output can then be utilized to control one or more actuators of the mobile robot to implement the corresponding low-level action. Continuing with the non-limiting example, control commands can be provided to one or more motors, which drive the wheel(s), to cause the wheel(s) to each achieve their respective angular and linear velocities.

The high-level policy model and low-level policy model are utilized cooperatively, and are utilized at each of a plurality of iterations during navigating the mobile robot to the navigation target—taking into account new current observation(s) at each iteration. The high-level output generated using the high-level policy model at each iteration indicates a corresponding high-level action for robot movement in navigating to the navigation target. The high-level policy model is trained to enable long-range planning and is trained to be utilized to generate, at each iteration, a corresponding high-level action that seeks to move the mobile robot closer to the navigation target. The low-level output generated at each iteration is based on the determined corresponding high-level action for that iteration, and is based on observation(s) for that iteration. The low-level policy model is trained to generate low-level output that defines low-level action(s) that define robot movement more granularly than the high-level action—and to generate low-level action(s) that avoid obstacles and/or that are efficient (e.g., distance and/or time efficiency). The separate but cooperatively utilized high-level and low-level policy models enable the high-level policy model to be utilized in determining high-level actions that are guided by the deployment environment and that seek to move the mobile robot toward a navigation target. However, the high-level actions determined using the high-level policy model cannot be used to precisely guide the robot. On the other hand, the low-level policy model can be utilized to generate low-level actions that can precisely guide the robot, and that achieve the high-level actions efficiently and safely (e.g., avoiding obstacles). As described herein, in various implementations the low-level policy model is utilized to generate control commands for only a subset (e.g., one or more) of the high-level actions and, for high-level action(s) not in the subset, the low-level action can be predefined or otherwise determined. For example, in implementations that include "forward", "turn left", and "turn right" as candidate high-level actions, the low-level policy model can be utilized to generate low-level actions for the "forward" high-level action, while a corresponding fixed low-level action is used for the "turn left" and "turn right" high-level actions.

The high-level and low-level policies can be cooperatively utilized to achieve efficient mobile robot navigation in an environment without reliance on a map of the environment to find a navigation path using planning algorithms. Accordingly, navigation in the environment can be performed without requiring generation of a map and without any reference to a map. Obviating map generation can conserve various robot and computer resources that would otherwise be required to generate a detailed map of the environment. Further, map-based navigation often requires storage, on the robot, of maps that require a large amount of storage space. Obviating the need to reference the map in navigation can prevent the need to store maps in the limited storage resources of the mobile robot.

Various implementations train the high-level policy model utilizing supervised training. For example, some of those various implementations perform supervised training by: using real-world observation(s) (e.g., images and/or other observation data) as at least part of the input to be processed by the high-level policy model during the supervised training; and generating losses during the supervised training using, as a supervision signal, ground truth navigation paths in the real environment. The ground truth navigation paths can be produced using path planning algorithm(s) (e.g., shortest path), can be based on human demonstrations of viable navigation paths, and/or otherwise generated. Since supervised learning has lower sample complexity, it can enable more efficient training as compared to reinforcement training techniques. Accordingly, a lesser quantity of resources (e.g., processor(s) resources, memory resources, etc.) can be utilized in supervised training techniques described herein, as compared at least to reinforcement techniques. Moreover, using the real-world observations during training of the high-level policy model can lead to improved performance of the model on real-world robots as compared to utilizing only simulated observations. This can be due to, for example, observations utilized in the training being real-world observations that are visually similar to observations that are made on the real robot during utilization of the model. As mentioned above, supervised training approaches described herein can enable efficient training of the high-level policy model while utilizing real-world observations.

Various implementations additionally or alternatively train the low-level policy model utilizing reinforcement training and optionally utilize a robot simulator in performing the reinforcement training. In some of those various implementations, the low-level policy model is trained by: utilizing simulated observation(s) from the robot simulator and high-level action(s) as at least part of the input to be processed by the low-level policy model during the reinforcement training; and utilizing simulated data from the robot simulator in generating rewards for use in training the low-level policy model. The rewards are generated based on a reward function, such as a reward function that penalizes robot collision while rewarding faster speeds and/or shorter distances in reaching navigation targets. For example, the reward function can heavily penalize movements that result in collisions, while rewarding collision free movements as a function of how fast and/or how straight the movements are.

In some implementations, the simulated observation(s) utilized in reinforcement training of the low-level policy model are simulated one-dimensional (1D) LIDAR component observations, simulated two-dimensional (2D) LIDAR component observations, and/or simulated proximity sensor observations. Such observations can be simulated with high fidelity in a simulated environment and can translate better to real observations as compared to, for example, RGB images. Moreover, such observations can be simulated with high fidelity even when the simulated environment is simulated with relatively low fidelity. Further, the physics of the robot can be simulated in the robot simulator, thereby enabling simulation of precise robot motions with simple depth perception, which can enable training of the low-level policy model to generate low-level actions that avoid obstacles and that are efficient.

Accordingly, various implementations enable training of the low-level policy model in a simulated environment utilizing simple depth observations (e.g., from 1D LIDAR, 2D LIDAR, and/or proximity sensor(s)). Such a low-level policy model can be effectively used on real robots, utilizing depth observations from the real robots (and optionally without utilizing any RGB image observations), to enable safe and efficient low-level control of those robots. Moreover, the low-level controls generated utilizing the low-level policy model are further based on high-level actions determined utilizing the high-level policy model. As described above, such high-level policy model can be trained utilizing real-world observations (that can include RGB image observations and/or other higher fidelity observations) and supervised training. Through the cooperative use and training of both the high-level policy model and the low-level policy model, high-level actions can be determined utilizing higher-fidelity real-world observations (and a target label and optionally lower-fidelity observations), while low-level actions are determined utilizing lower-fidelity real-world observations (and the determined high-level actions). This can be enabled through the separation of the two models, while cooperatively training (e.g., by using high-level actions in training of the low-level policy model, but not necessarily high-level actions generated using the high-level policy model) and cooperatively utilizing the two models.

The above description is provided as an overview of only some implementations disclosed herein. These and other implementations are described in more detail herein.

Other implementations may include at least one transitory or non-transitory computer readable storage medium storing instructions executable by one or more processor(s) (e.g., a central processing unit(s) (CPU(s)), graphics processing unit(s) (GPU(s)), and/or tensor processing unit(s) (TPU(s))) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
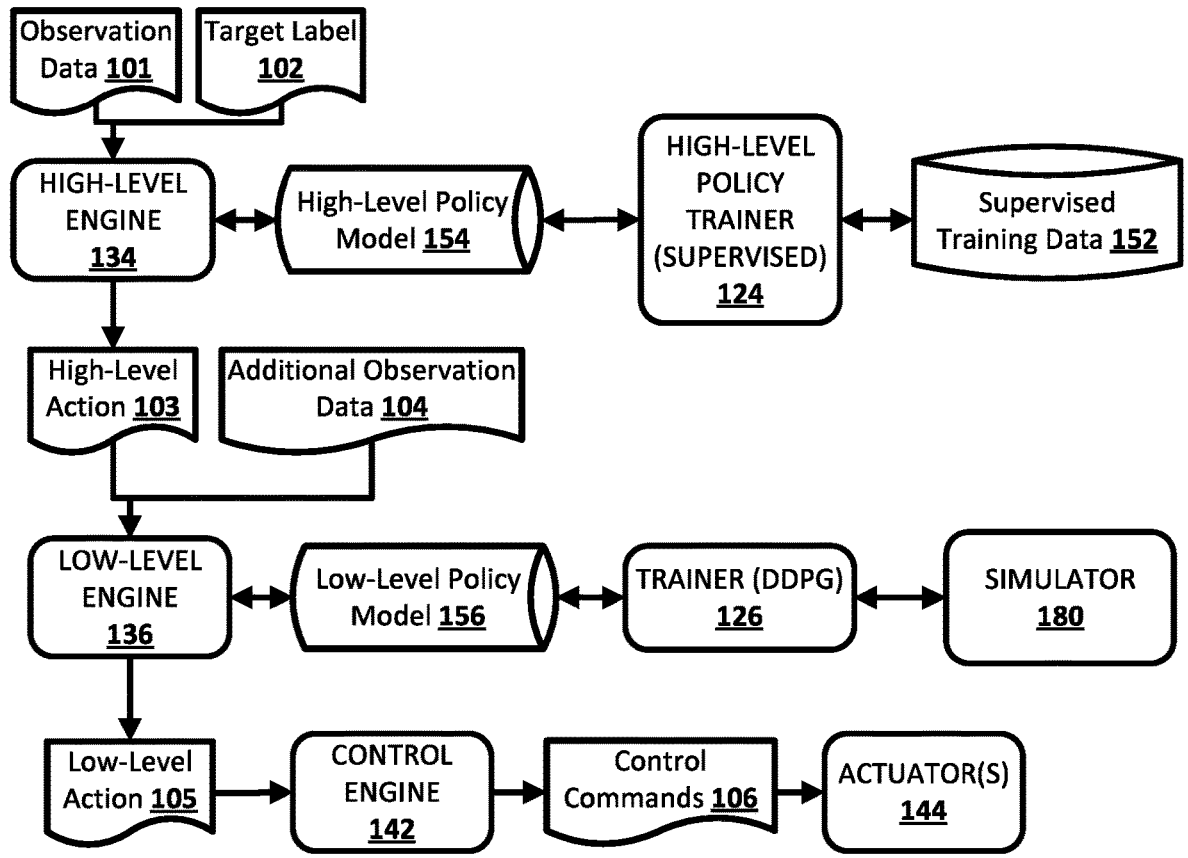
FIG. 1 illustrates an example environment in which implementations disclosed herein can be implemented.
Figure 1:
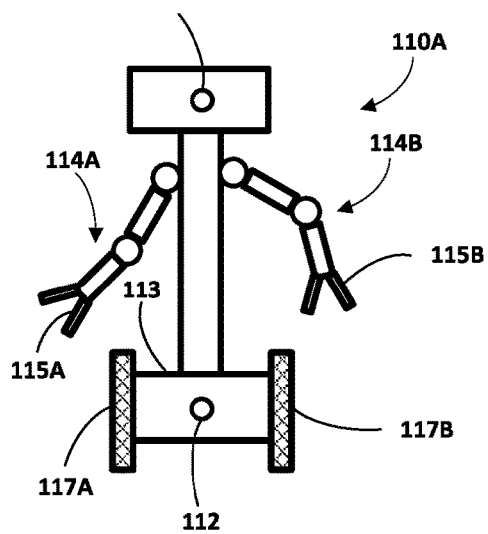

Implementations disclosed herein include a high-level policy model that is utilized for long range planning in mobile robot navigation. It is trained to be utilized to generate, based on a current robot observation and a target label, a high-level action output that indicates the best high-level action for a mobile robot to enable the mobile robot to get closer to a navigation target. The best high-level action can be one of a plurality of discrete high-level actions of a defined high-level action space. As one non-limiting example, the discrete high-level actions can include, or be restricted to, general navigation instructions such as "forward", "turn left", and "turn right". Implementations further include a low-level policy model that is utilized to generate, based on the best high-level action and a current robot observation (that can be the same or different from the observation utilized with the high-level policy model), low-level action output that defines a corresponding low-level action that can be executed on the robot in a safe, robust, and efficient manner. The low-level action can be one of a defined low-level action space, such as a continuous robot motion space. At the same time, the low-level action avoids obstacles in its vicinity, and as such, isn't executing the high-level commands verbatim.

The two policy models have complementary properties. The high-level policy model is trained in view of the deployment environment, thereby enabling its use to plan in the deployment environment. However, the high-level policy model cannot be utilized precisely guide the robot. The low-level policy model is not trained in view of the environment, thereby generating low-level actions without knowledge of the environment. However, the low-level policy model can be utilized to move the robot precisely and safely.

Prior to reference to the Figures, an overview of particular implementations of technology disclosed herein is provided. It is understood that the disclosure herein is not limited to such implementations, and additional implementations are disclosed herein (e.g., in the Summary, the remainder of the Detailed Description, and the Claims).

In some implementations, the high-level policy model takes, as inputs: observation data, such as an RGB image x (or embedding thereof) and a binary proximity indicator $p \in \{0,1\}$; and a target label, such as a one hot vector $g \in \{0,1\}^k$ denoting one out of k possible target locations in the environment. The proximity indicator can be, for example, the output of a radar reading and can indicate whether a collision is imminent. For example, it can defined as 1 if there is an object within 0.3 m, or other threshold— and defined as a 0 otherwise. When the target label is a one hot vector as described above, the one hot value in the vector has semantic meaning (e.g., different one-hot values are utilized for different navigation targets), but does not necessarily have any correlation to a deployment environment for which the high-level policy model is being trained. Additional or alternative target labels can be utilized in various implementations, such as a target label that is a word embedding of a semantic descriptor of a navigation target, a target label that is an image embedding of an image of a navigation target, and/or other target label that provides semantic meaning for the navigation target.

In some implementations, the output action space of the high-level policy model is defined as $\mathcal{A}_{high}$ and includes a plurality of discrete actions such as forward, turn left, and/or turn right. The forward motion can be intended to be, for example, 1 m; and the turns can be intended, for example, fifteen degrees. Note, however, one or more of these values are approximate (e.g., at least the forward motion), as their semantics are established during training of, for example, the low-level policy model.

With the above notation, the high-level policy model is trained to be utilized to output a value, $v(a, x; g)$, estimating the progress towards the target g, defined as the negative change in distance to g if action a is taken at observation x. This value function can be used to estimate which action moves the robot closest to the target:

$$a_{high} = \arg\max_{a \in \mathcal{A}_{high}} v(a, x; g)$$

The above value function can be implemented utilizing a recurrent neural network (RNN) taking as input the concatenated and transformed embeddings of the observation x, target label g, and the proximity bit p: $v(a, x; g) = \text{LSTM}(\text{MLP}_2(\text{ResNet50}(x), p, \text{MLP}_1(g)))$. The RNN can be, for example, a single layer long short term memory (LSTM) network model, or other memory network model (e.g., gated recurrent unit (GRU)). The image embedder can be a neural network model that is used to process an image and generate a condensed (relative to the pixel size) embedding of the image, such as a ResNet50 network. The target label g can be, for example, a one hot vector over k possible locations, and/or other target label such as those described above. $\text{MLP}_l$ in the preceding notation stands for an l-layer perceptron with ReLU. The dimensions of the above perceptrons and the LSTM network model can be, for example, set to 2048 or other value.

Certain action(s) in $\mathcal{A}_{high}$ can potentially be executed verbatim without any danger of collision. For example, "rotate left" and "rotate right" can be executed without any danger of collision. Accordingly, in some implementations, for such actions they can optionally be implemented using a corresponding default low-level action defined for the corresponding particular high-level action. However, other action(s) in $\mathcal{A}_{high}$ can potentially lead to a collision, such as a "forward" action. A separate low-level policy model can optionally be trained and utilized to execute such action(s) (e.g., a "forward' action).

The input to the low-level policy model can be, for example, a 1-dimensional LIDAR reading, a 2-dimensional LIDAR reading, and/or a proximity sensor reading. Such reading(s), while low fidelity (e.g., as compared to 3D LIDAR and/or RGB images), are able to capture obstacles, which is sufficient for short term safe control. The low-level action space $\mathcal{A}_{low}$ can be continuous, and can optionally be defined by the kinematics of the robot. As one non-limiting example, for a differential drive mobile base the action space $\mathcal{A}_{low}$ can be a 4-dimensional real valued vector of the twist values for the two wheels (linear and angular velocities for each wheel).

In some implementations, the low-level policy model can be a convolutional neural network (CNN) that can process, as input, the last n LIDAR readings (and/or other readings), where n can be greater than one in various implementations. For example, the last 3 readings, $x, x_{-1}, x_{-2}$ can be processed and, since they are optionally 1-dimensional (e.g., 1D LIDAR or proximity sensor), they can be concatenated into an image, where the second dimension is time. The output generated using the low-level policy model can be values in the low-level action space mentioned above. More formally, the low-level action, $a_{low}$, generated can be represented as:

$$a_{low} = \text{ConvNet}(\text{concat}(x_{-2}, x_{-1}, x))$$

where $a_{low} \in \mathcal{A}_{low}$, and where ConvNet is a CNN model, such as a CNN model with the following 4 layers: conv([7, 3,16], 5)→conv([5,1,20], 3)→f c(20)→, where conv(k,s)

denotes convolution with kernel k and stride s, and fc(d) is a fully connected layer with output dimension d.

In some implementations, training of the high-level policy model can utilize real images X from the deployment world obtained via traversals. The images can be captured, for example, by monographic camera(s) (e.g., RGB images), stereographic camera(s) (e.g., RGBD images), and/or other higher fidelity vision component. These images represent states of the robot in the world and can be organized in a graph, whose edges represent actions moving the robot from one state to another. In some of those implementations, the images are based on images captured via a rig of six cameras (or other vision components) organized in a hexagonal shape. This rig is moved along the environment (e.g., hallways and spaces), and every 1 m (or other distance) a set of images is captured. The rig can be mounted, for example, to a mobile robot base that is optionally human-guided along the environment and/or can be mounted to a human and/or to a non-robotic base that is guided along the environment.

After the images are captured, they can optionally be stitched into a 360 degree panorama, which can be cropped in any direction to obtain images of the desired field of view (FOV). This can allow for creating observations with identical properties (e.g., FOV) as the robot camera. For example, a FOV of 108 degrees and 90 degrees, along the width and height respectively, can be utilized to mimic a robot camera having the same FOV. Each panorama can be cropped every X degrees to obtain Y separate images. For example, each panorama can be cropped every 15 degrees to obtain 24 separate images. Further, edges can be defined between the images, where the edges represent actions. For example, two rotational actions "turn left" and "turn right" can be represented, which move the robot to the next left or right image respectively at the same location.

The poses of the images can also be estimated and assigned to the images. For example, a Cartographer localization API and/or other technique(s) can be utilized to estimate the poses of the images. The estimation of the poses can be based on only locally correct SLAM and loop closure. Hence, the high precision necessary for global geometric maps is not needed and, moreover, mapping of the surroundings is not needed.

Action(s) can also be defined between the images from different panoramas. For example, a "forward" action can be defined as an edge between two images, where the "forward" action is from a current image to a nearby image by moving in the direction of the current view. The nearby image can be one that is ideally at a fixed distance (e.g., 1.0 m) from the current view. However, there is no guarantee that images have been captured at that new location. Accordingly, the action can still be considered possible (and a corresponding image utilized) if there is an image captured within a range of the fixed distance (e.g., from 0.7 m to 1.0 m).

The images organized in a graph, whose edges represent actions moving the robot from one state to another, can be of relatively high visual fidelity. Further, the traversals defined by the graph can cover most of the designated spaces of a deployment environment. However, the high-level actions capture rough motions. Accordingly, they can be used to express a navigation path, but cannot be executed robustly on a robot. Hence, in various implementations the images and high-level actions are utilized to train a high-level policy model only.

The training utilized to train the high-level policy model can be formulated as a supervised learning problem, which is in contrast to recent reinforcement learning (RL)-based approaches. For goal driven navigation, optimal paths can be produced (and utilized as a supervision signal) by employing shortest path algorithms (and/or other path optimization algorithms), or having human demonstrations of viable navigation paths. These paths can be used as supervision at every step of the policy execution, when present. Since supervised learning has lower sample complexity, it plays as an advantage over RL when it comes to efficiency.

To define the training loss, consider a set of navigation paths $P=\{p_1, \ldots, p_N\}$ leading to one of several predefined targets. These paths can be defined over the graph that organizes the images. $\mathcal{P}$ can be the set of all shortest paths to targets produced by the shortest path planner.

For a target g, a starting state x (e.g., a starting image), and a path $p \in \mathcal{P}$, d(x, g; p) can denote the distance from x to g along p if both start and target are on the path in this order. If one of them or both are not on the path, then the above distance is infinity. Using the full $\mathcal{P}$, the shortest path in $\mathcal{P}$ which leads from x to g can be considered:

$$d(x, g; \mathcal{P}) = \min_{p \in \mathcal{P}} d(x, g; p)$$

Using d, the progress toward target g, if high-level action a is applied at state x, can be defined as:

$$y(a,x;g) = d(x,g;\mathcal{P}) - d(x',g;\mathcal{P})$$

where x' is the image at which one arrives after taking action a.

The loss trains the high-level policy model to lead to generation of output values as close as possible toy. In many implementations, a RNN model is used as the high-level policy model, and the loss is defined over whole navigation paths. If the navigation path is denoted as $x=(x_1, \ldots, x_T)$, then the loss can be represented by:

$$\text{Loss}(x,g) = \Sigma_{x_t \in x} \Sigma_{a \in A_{high}} (v(a,x_t;g) - y(a,x_t;g))^2$$

where the model v can be, for example, $v(a, x; g) = \text{LSTM}(\text{MLP}_2(\text{ResNet50}(x), p, \text{MLP}_1(g)))$ as defined above. Stochastic Gradient Descent can optionally be utilized to update the RNN model based on the loss, where at each step of the training a navigation path can be generated and the above loss formulated to perform gradient updates. These paths are generated using the current high-level policy model and a random start point. At the beginning of the training, utilizing the high-level policy model results in performance of random actions, and as such the navigation paths are random. As the training progresses the navigation paths become more meaningful and the above loss emphasizes on situations which will be encountered at inference time.

In various implementations, the low-level policy model is trained in one or more synthetic environments, such as a synthetic environment that includes several hallways and rooms. The synthetic environment(s) can be generated using a 2D layout, which is lifted in 3D by extending the walls up. The synthetic environment(s) can differ from the deployment environment that is optionally utilized in the high-level policy model training. The observations utilized in training the low-level policy model can be relatively lower fidelity observations, such as 1D depth images, 2D depth images, and/or other lower fidelity observation. Due to their simplicity, these observations, although lower fidelity relative to the observations utilized in training the high-level policy model, can be simulated with high fidelity and the trained models transfer to real robots. In addition, the physics of the robot can be simulated in the simulated environment, using a physics engine such as a PyBullet physics engine. Thus, precise robot motions can be simulated with simple depth perception, which is sufficient to train low-level obstacle avoidance control transferable to the real world.

In various implementations, continuous Deep Q-Learning (DDPG) is used in training the low-level policy model. For example, the policy can be to execute a "forward" action without colliding with objects. With such a policy and for a robot having a differential drive, the reward R(x, a) needed by DDPG for a given action a at a state x can be highest if the robot is moving straight as quickly as possible without colliding:

$$R(x, a) = \begin{cases} R_{lin} v_{lin}(a) + R_{ang} |v_{ang}(a)| \\ R_{collision} \end{cases}$$

where $v_{lin}(a)$ and $v_{ang}(a)$ denote the linear and angular velocity of the differential drive after applying the current action a (in the current state which is omitted for brevity). If this action results in no collision, the reward is a function of how fast ($R_{lin}=1.0$) and how straight ($R_{ang}=-0.8$) the robot moves. If there is a collision, then the robot incurs a large negative reward $R_{collision}=-1.0$. Whether there is a collision can be easily ascertained in the simulated environment.

The employed DDPG algorithm can utilize a critic network which approximates the Q value for given state x and action a.

Turning now to the Figures, FIG. 1 illustrates an example environment in which implementations disclosed herein can be implemented. FIG. 1 includes a low-level policy model 156 and a high-level policy model 156. The high-level policy model 154 can be trained by a high-level policy trainer 124. The high-level policy trainer 124 can utilize supervised training data 152 and supervised learning in training the high-level policy model, as described herein.

The low-level policy model 156 can be trained by a low-level policy trainer 126 (which can use a DDPG algorithm). The low-level policy trainer 126 can interact with a simulator 180, that simulates a simulated environment and a simulated robot interacting within the simulated environment, in training the low-level policy model utilizing reinforcement learning.

Robot 110 is also illustrated in FIG. 1, and is one example of a physical (i.e., real-world) mobile robot that can utilize a high-level policy model and low-level policy model, trained according to implementations disclosed herein, in the performance of robot navigation tasks. Additional and/or alternative robots may be provided, such as additional robots that vary in one or more respects from robot 110 illustrated in FIG. 1. For example, a mobile forklift robot, an unmanned aerial vehicle ("UAV"), and/or a humanoid robot may be utilized instead of or in addition to robot 110.

Robot 110 includes a base 113 with wheels 117A, 117B provided on opposed sides thereof for locomotion of the robot 110. The base 113 may include, for example, one or more motors for driving the wheels 117A, 117B of the robot 110 to achieve a desired direction, velocity, and/or acceleration of movement for the robot 110.

Robot 110 also includes a vision component 111 that can generate observation data related to shape, color, depth, and/or other features of object(s) that are in the line of sight of the vision component 111. The vision component 111 may be, for example, a monocular camera, a stereographic camera, and/or a 3D LIDAR component. The robot 110 also includes an additional vision component 112 that can generate observation data related to shape, color, depth, and/or other features of object(s) that are in the line of sight of the vision component 112. The vision component 112 may be, for example, a proximity sensor, a one-dimensional (1D) LIDAR component, or a two-dimensional (2D) LIDAR component. In various implementations, the vision component 111 generates higher fidelity observations (relative to the vision component 112).

Robot 110 also includes one or more processors that, for example: implement the high-level engine 134 and the low-level engine 136 (described below) and provide control commands to actuators and/or other operational components thereof based on low-level actions generated utilizing the low-level policy model (and based on output generated using the high-level policy model 154). The robot 110 also includes robot arms 114A and 114B with corresponding end effectors 115A and 115B that each take the form of a gripper with two opposing "fingers" or "digits." Although particular grasping end effectors 115A, 115B are illustrated, additional and/or alternative end effectors may be utilized, such as alternative impactive grasping end effectors (e.g., those with grasping "plates", those with more or fewer "digits"/"claws"), "ingressive" grasping end effectors, "astrictive" grasping end effectors, or "contigutive" grasping end effectors, or non-grasping end effectors. Additionally, although particular placements of vision components 111 and 112 are illustrated in FIG. 1, additional and/or alternative placements may be utilized.

As mentioned above, processor(s) of the robot 110 can implement high-level engine 134 and low-level engine 136, which operate utilizing respective of high-level policy model 154 and low-level policy model 156, once they have been trained. The high-level engine 134 can process observation data 101 and a target label 102 utilizing the high-level policy model 154 to generate a high-level action 103. The observation data 101 can include, for example, a current observation from the vision component 111 (and optionally a current observation from vision component 112 and/or other sensor(s)). The target label 102 can be, for example a one hot vector, a word embedding of a semantic descriptor of a navigation target, a target label that is an image embedding of an image of a navigation target, and/or other target label that provides semantic meaning for the navigation target.

The low-level engine 136 processes the high-level action 103, and additional observation data 104, using the low-level policy model 156, to generate a low-level action 105. The additional observation data 104 can be, for example, a current observation from the vision component 112. The low-level action 105 is provided to control engine 142, which can also be implemented by processor(s) of the robot 110, which generates corresponding control commands 106 that are provided to actuator(s) 144 to cause the robot 110 to implement the low-level action 105. This process can be continued, relying each time on new current observation data 101 and new current additional observation data 104, until a navigation target is reached. Through continual performance, navigation of the robot 110, to a target corresponding to the target label 102, can be achieved.

Figure 2:
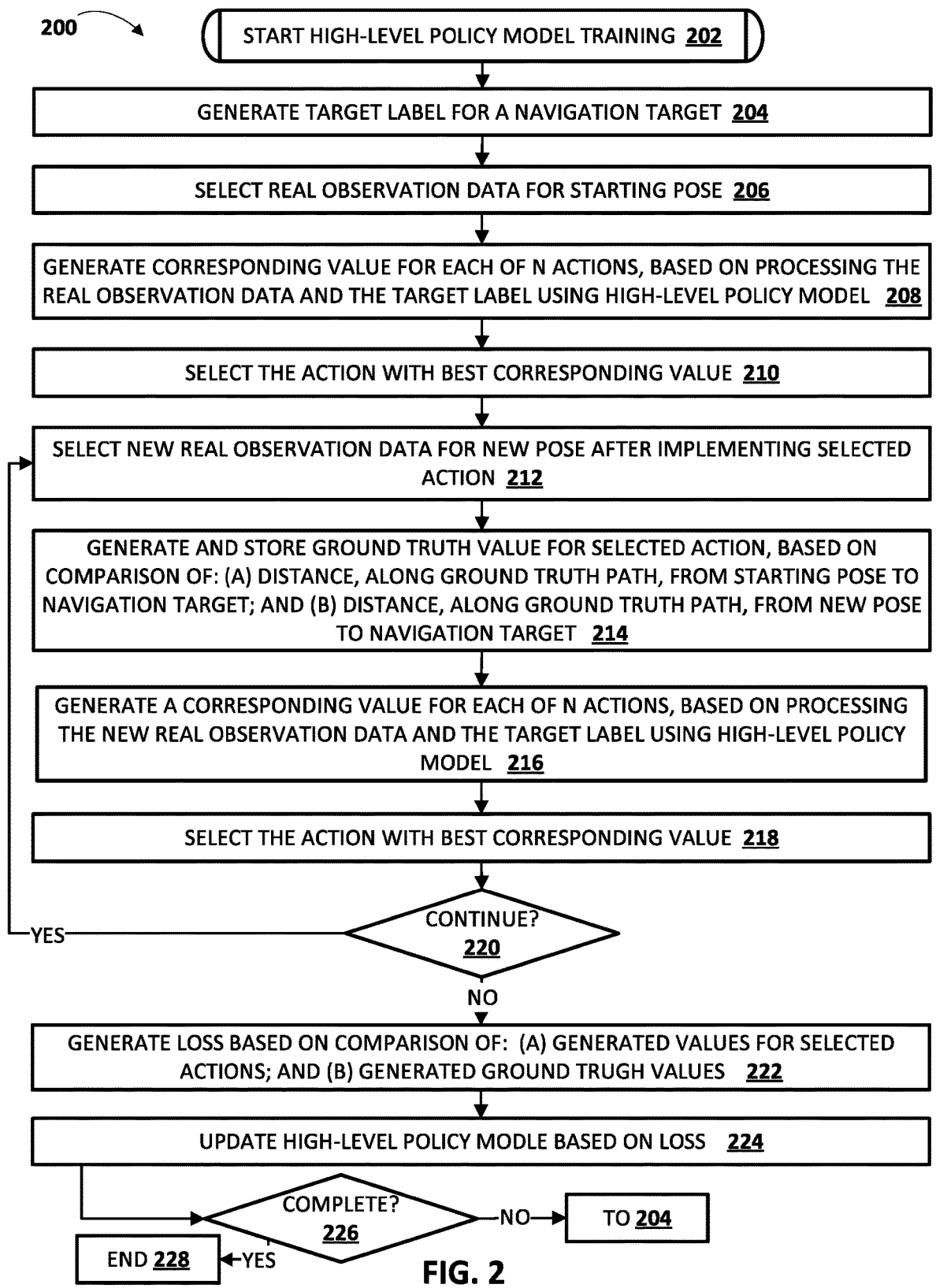
FIG. 2 is a flowchart illustrating an example method of training a high-level policy model according to various implementations disclosed herein.

Turning now to FIG. 2, a flowchart is provided illustrating an example method 200 of training a high-level policy model according to various implementations disclosed herein. For convenience, the operations of the flow chart are described with reference to a system that performs the operations. This system may include one or more components of one or more computer systems, such as one or more processors. Moreover, while operations of method 200 are shown in a particular order, this is not meant to be limiting. One or more operations may be reordered, omitted or added.

At block 202, the system starts high-level policy model training.

At block 204, the system generates a target label for a navigation target. For example, the target label can be a semantically meaningful one-hot vector or other target label described herein.

At block 206, the system selects real observation data for a starting pose. For example, the real observation data can include a real RGB image from a deployment environment in which the high-level policy model is to be deployed.

At block 208, the system generates a corresponding value for each of N high-level actions based on processing the real observation data and the target label using a high-level policy model. For example, the system can generate a first measure for a forward action, a second measure for a turn right action, and a third measure for a turn left action.

At block 210, the system selects the action with the best corresponding value, of the corresponding values generated at block 208.

At block 212, the system selects new real observation data for a new pose after implementing the selected action. For example, the system can select a new real image based on it being defined, by an edge of a graph that organizes real images, as correlated to the observation data of block 206, by the selected action. For instance, for a turn right action, an image that is from the same location, but X degrees to the right, can be selected at bock 412. Also, for instance, for a forward action, an image that is 1 meter away from the image of the observation data of block 206, and along the same direction as the image of observation data of block 206, can be selected.

At block 214, the system generates and stores a ground truth value for the selected action. The system can generate the ground truth value based on comparison of: (A) a distance, along a ground truth path (e.g., a shortest path from an optimizer, or a human demonstrated path), from a preceding pose to the navigation target; and (B) a distance, along the ground truth path, from the new pose to the navigation target. In an initial iteration of block 214 the preceding pose will be the starting pose. In future iterations the preceding pose will be the new pose determined in an iteration of block 212 that immediately preceded the most recent iteration of block 212.

At block 216, the system generates a corresponding value for each of the N actions based on processing the new real observation data and the target label using the high-level policy model.

At block 218, the system selects the action with the best corresponding value. The system then proceeds to block 220 and determines whether to continue with the current supervised episode. If so, the system proceeds back to block 212 and performs another iteration of blocks 212, 214, 216, and 218. The system can determine to continue with the current supervised episode if the target specified by the navigation target has not yet been reached, if a threshold quantity of iterations of blocks 212, 214, 216, and 218 have not yet been performed, and/or if other criteria hasn't yet been satisfied.

If, at block 220, the system determines not to continue with the current supervised episode (e.g., the navigation target has been reached), the system proceeds to block 222. At block 222, the system generates a loss based on comparison of: (A) the generated values for selected actions (generated at block 208 and iteration(s) of block 216); to (B) the generated ground truth values (generated at iterations of block 214).

At block 224, the system then updates the high-level policy model based on the loss.

At block 226, the system determines whether training of the high-level policy model is complete. If not, the system proceeds back to block 204 and performs another iteration of blocks 204-224. If so, the system proceeds to block 228 and training of the high-level policy model ends. The decision of block 226 can be based on, for example, whether a threshold quantity of episodes have been performed and/or other factor(s).

Figure 3:
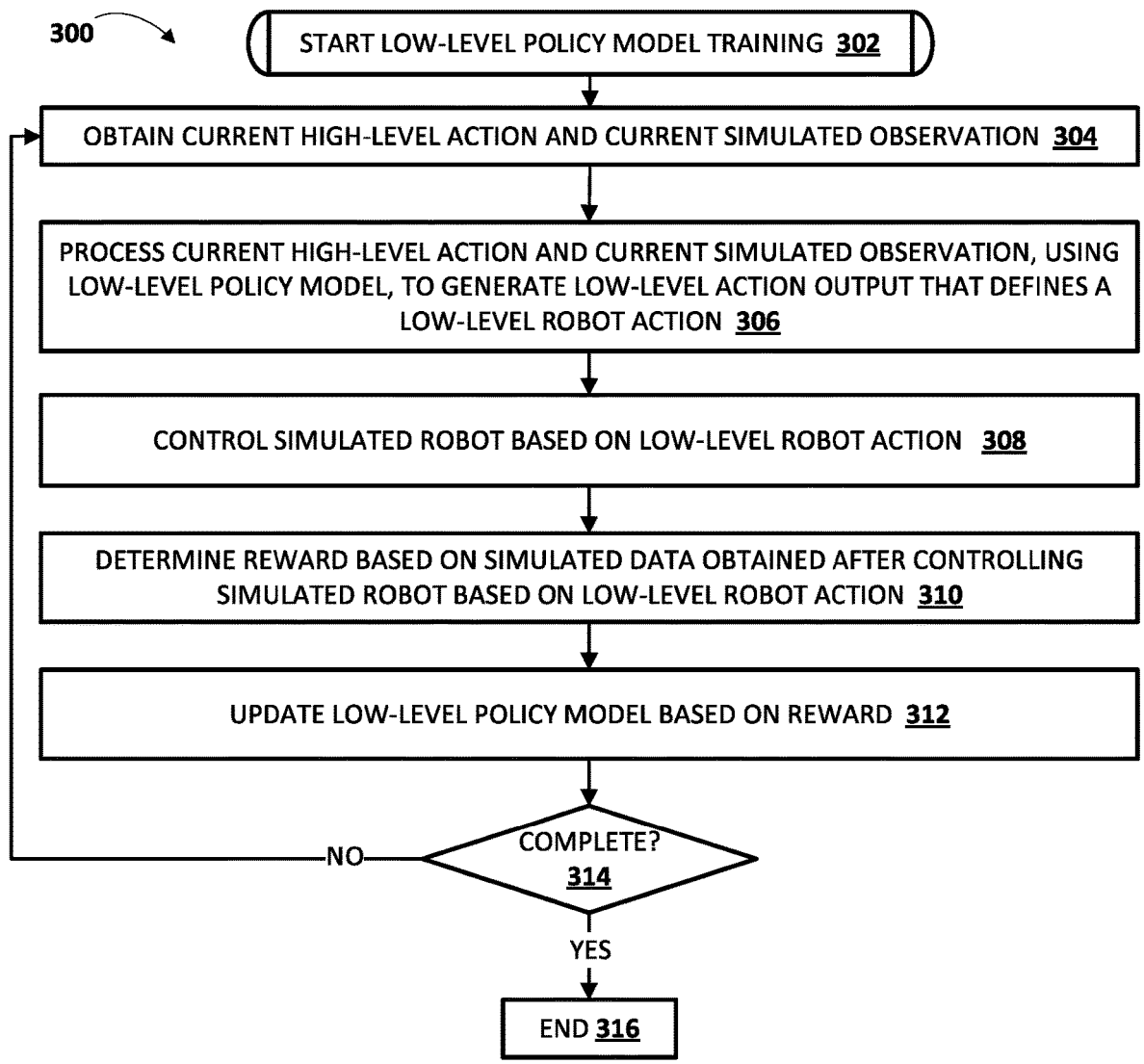
FIG. 3 is a flowchart illustrating an example method of training a low-level policy model according to various implementations disclosed herein.

FIG. 3 is a flowchart illustrating an example method 300 of training a low-level policy model according to various implementations disclosed herein. For convenience, the operations of the flow chart are described with reference to a system that performs the operations. This system may include one or more components of one or more computer systems, such as one or more processors. Moreover, while operations of method 300 are shown in a particular order, this is not meant to be limiting. One or more operations may be reordered, omitted or added.

At block 302, the system starts low-level policy model training.

At block 304, the system obtains a current high-level action and a current simulated observation. The current high-level action can be, for example, a forward action and/or other high-level action(s) for which the low-level policy model is being trained. The current simulated observation can be a simulated observation from a simulated 1D LIDAR component, a simulated 2D LIDAR component, and/or other simulated component. Optionally, at block 304 the system also obtains the N preceding simulated observations, such as the two last simulated observations (in addition to the current simulated observation).

At block 306, the system processes the current high-level action and the current simulated observation, using a low-level policy model, to generate low-level action output that defines a low-level robot action. In some implementations, the system also processes the N preceding observations (if any), such as the two last observations (in addition to the current observation), in generating the low-level action output.

At block 308, the system controls a simulated robot based on the low-level robot action. The simulated robot can be controlled in a simulator that simulates the robot using a physics engine, and that also simulates an environment.

At block 310, the system determines a reward based on simulated data obtained after controlling the simulated robot based on the low-level robot action. The reward can be determined based on a reward function, such as a reward function that penalizes robot collision while rewarding faster speeds and/or shorter distances in reaching navigation targets. For example, the reward function can heavily penalize movements that result in collisions, while rewarding collision free movements as a function of how fast and/or how straight the movements are.

At block 312, the system updates the low-level policy model based on the reward. In some implementations, block 312 is performed after each iteration of block 310. Although not explicitly illustrated in FIG. 3 for simplicity, in some other implementations, block 312 is performed only after a plurality of iterations of blocks 304, 306, 308, and 310. In those other implementations, updating the low-level policy model is based on the rewards from the plurality of iterations. For example, in those other implementations multiple iterations of blocks 304, 306, 308, and 310 can be performed during a simulated episode (or during multiple simulated episodes). For instance, in performing multiple iterations of blocks 304, 306, 308, and 310 during a simulated episode, the current simulated observation at non-initial iterations of block 304 can be the simulated observation that results from performance of a most recent iteration of block 308—and the last observation(s) optionally processed at block 306 can be the current observations of the most recent preceding iteration(s) of block 304. The multiple iterations of blocks 304, 306, 308, and 310 can be performed iteratively during a simulated episode until one or more conditions occur such as a threshold quantity of iterations, a collision of the simulated robot with an environmental object (as determined in block 310), and/or other condition(s). Accordingly, in various implementations block 312 can be performed in a batch manner and can update the model based on a plurality of rewards determined during a continuous simulated episode.

At block 314, the system determines whether training of the low-level policy model is complete. If not, the system proceeds back to block 304 and performs another iteration of blocks 304-312. If so, the system proceeds to block 316 and training of the low-level policy model ends. The decision of block 314 can be based on, for example, whether a threshold quantity of episodes have been performed and/or other factor(s).

Figure 4:
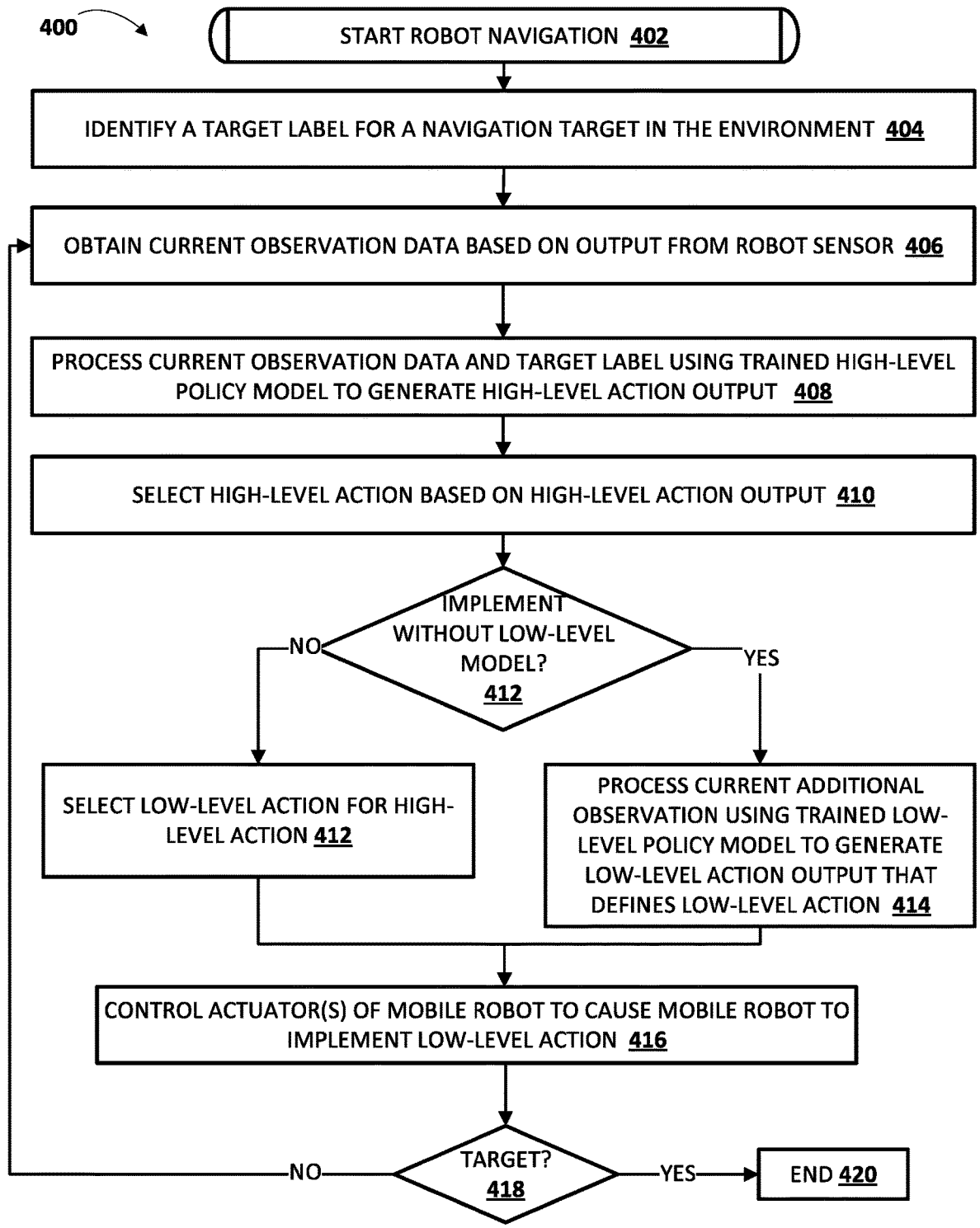
FIG. 4 is a flowchart illustrating an example method of utilizing a high-level policy model and a low-level policy model in navigating a mobile robot to a navigation target.

FIG. 4 is a flowchart illustrating an example method 400 of utilizing a high-level policy model and a low-level policy model in navigating a mobile robot to a navigation target. For convenience, the operations of the flow chart are described with reference to a system that performs the operations. This system may include one or more components of one or more computer systems, such as one or more processors of a robot. Moreover, while operations of method 400 are shown in a particular order, this is not meant to be limiting. One or more operations may be reordered, omitted or added.

At block 402, the system starts robot navigation.

At block 404, the system identifies a target label for a navigation target in the environment. The target label can be a semantically meaningful one hot vector, a word embedding of a semantic descriptor of a navigation target, a target label that is an image embedding of an image of a navigation target, and/or other target label that provides semantic meaning for the navigation target. The target label can be generated based on user interface input and/or based on output from a higher-level task planner that identifies the navigation target. For example, a target label for a "trash can" can be generated based on spoken user interface input of "navigate to the trash can". For instance, the target label can be based on an image of a "trash can" identified based on the spoken user interface input and/or based on a word embedding of "trash can".

At block 406, the system obtains current observation data based on output from robot component(s). For example, the current observation data can include a current image captured by a camera of the robot, and optionally a current proximity sensor reading of a proximity sensor of the robot.

At block 408, the system processes the current observation data and the target label, using a trained high-level policy model, to generate high-level action output. For example, the high-level action output can include a corresponding measure for each of N separate high-level actions.

At block 410, the system selects a high-level action based on the high-level action output. For example, the system can select the high-level action with the "best" measure (e.g., the highest when higher measures are more indicative of the best high-level action).

At block 412, the system determines whether the high-level action can be implemented without utilization of a low-level policy model. For example, action(s) such as "turn left" or "turn right" may optionally be implemented without utilization of the low-level policy model, while other action (s) such as "forward" require utilization of the low-level policy model.

If, at block 412, the system determines the high-level action can be implemented without utilization of the low-level policy model, the system proceeds to block 412 and selects a low-level action for the high-level action. For example, if the high-level action is "turn right", a default low level action for "turn right" can be selected.

If, at block 412, the system determines the high-level action cannot be implemented without utilization of the low-level policy model, the system proceeds to block 414 and processes a current additional observation using a trained low-level policy model to generate low-level action output that defines a low-level action. For example, if the high-level action is "forward", then current additional observation data can be processed (optionally along with the preceding N additional observation data instances) to generate low-level action output that defines a low-level action. The high-level action of "forward" can also optionally be processed, along with the current additional observation data, in generating the low-level action output. For example, the additional observation data can include a depth reading from a 1D LIDAR component of the robot. Although referenced herein as "additional" observation data, in various implementations the current additional observation data of block 412 may also be processed, along with other current observation data, at block 408 in generating the high-level action output.

At block 416, the system controls actuator(s) of the mobile robot to cause the mobile robot to implement the low-level action of block 412 or of block 414.

At block 418, the system determines whether the navigation target, indicated by the target label, has been reached. If not, the system proceeds back to block 406 and performs another iteration of block 406-416 using new current observation data. If so, the system proceeds to block 420, and navigation to the navigation target ends. Another iteration of method 400 can be performed responsive to identifying a new navigation target in the environment.

Figure 5:
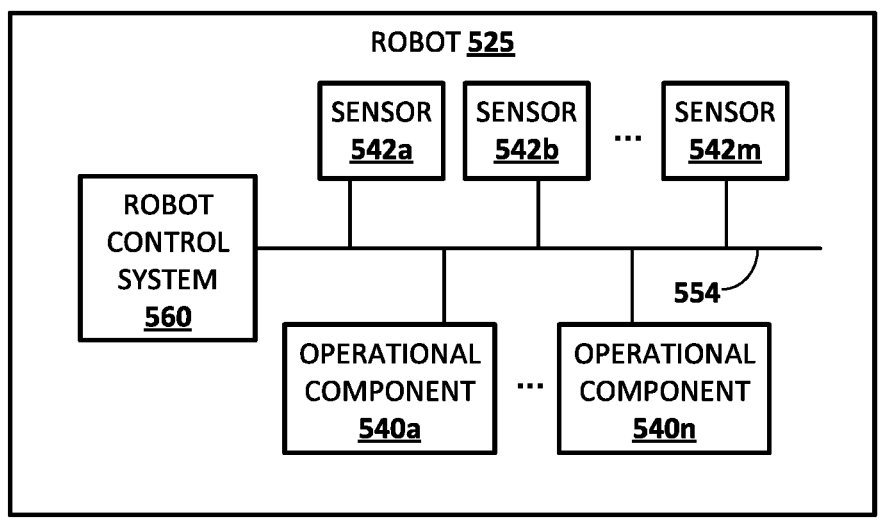
FIG. 5 schematically depicts an example architecture of a robot.

FIG. 5 schematically depicts an example architecture of a robot 525. The robot 525 includes a robot control system 560, one or more operational components 540a-540n, and one or more sensors 542a-542m. The sensors 542a-542m may include, for example, vision sensors, light sensors, pressure sensors, pressure wave sensors (e.g., microphones), proximity sensors, accelerometers, gyroscopes, thermometers, barometers, and so forth. While sensors 542a-542m are depicted as being integral with robot 525, this is not meant to be limiting. In some implementations, sensors 542a-542m may be located external to robot 525, e.g., as standalone units.

Operational components 540a-540n may include, for example, one or more end effectors and/or one or more servo motors or other actuators to effectuate movement of one or more components of the robot. For example, the robot 525 may have multiple degrees of freedom and each of the actuators may control actuation of the robot 525 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 560 may be implemented in one or more processors, such as a CPU, GPU, and/or other controller(s) of the robot 525. In some implementations, the robot 525 may comprise a "brain box" that may include all or aspects of the control system 560. For example, the brain box may provide real time bursts of data to the operational components 540a-540n, with each of the real time bursts comprising a set of one or more control commands that dictate, inter alia, the parameters of motion (if any) for each of one or more of the operational components 540a-540n. In some implementations, the robot control system 560 may perform one or more aspects of method 400 described herein.

As described herein, in some implementations all or aspects of the control commands generated by control system 560 in performing a robotic task can be based on utilization of trained low-level and high-level policy models as described herein. Although control system 560 is illustrated in FIG. 5 as an integral part of the robot 525, in some implementations, all or aspects of the control system 560 may be implemented in a component that is separate from, but in communication with, robot 525. For example, all or aspects of control system 560 may be implemented on one or more computing devices that are in wired and/or wireless communication with the robot 525, such as computing device 610.

Figure 6:
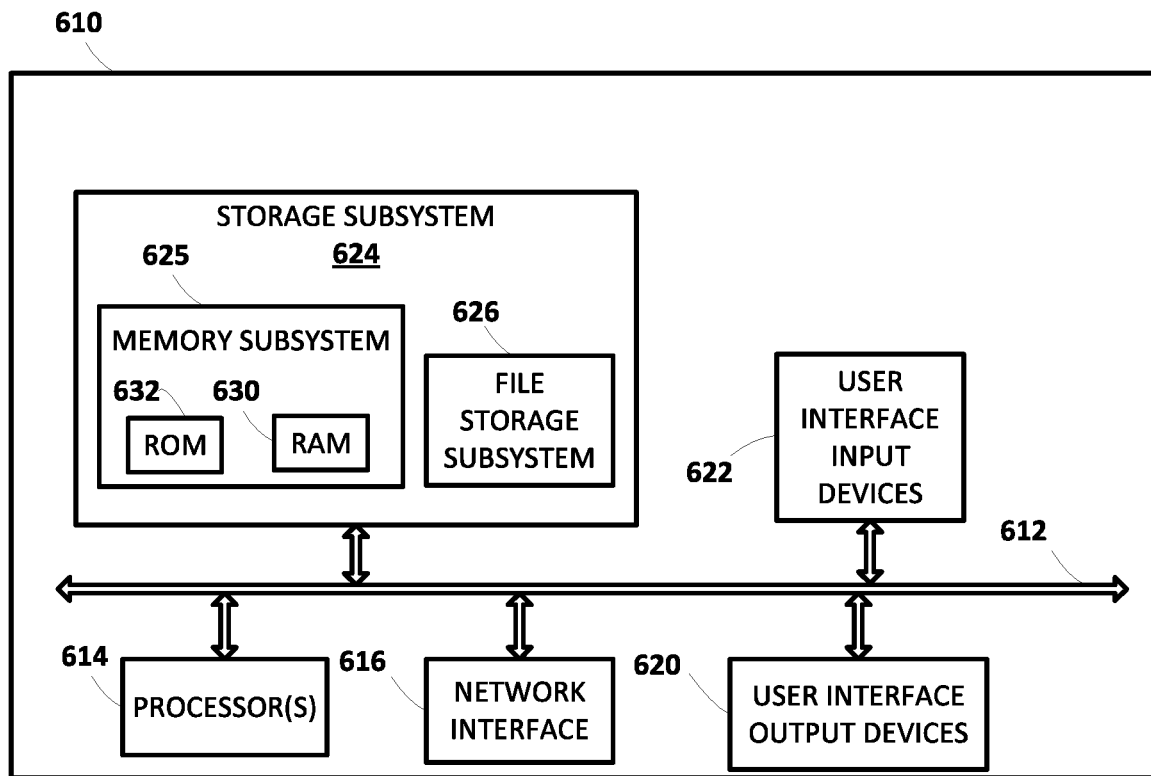
FIG. 6 schematically depicts an example architecture of a computer system.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of one or more methods described herein.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In some implementations, a method of navigating a mobile robot in an environment is provided and includes identifying a target label for a navigation target in the environment, and navigating the mobile robot to the navigation target. Navigating the mobile robot to the navigation target includes, at each of a plurality of iterations during the navigation to the navigation target: obtaining corresponding current observation data that is based on corresponding current output from a sensor component of the mobile robot; processing the corresponding current observation data, and the target label, using a trained high-level policy model to generate a corresponding high-level action output; using the corresponding high-level action output to select a corresponding particular high-level action from a plurality of discrete high-level actions of a defined high-level action space; obtaining corresponding current additional observation data that is based on corresponding current additional output from an additional sensor component of the mobile robot; processing the corresponding current additional observation data, and the corresponding particular high-level action, using a trained low-level policy model to generate corresponding low-level action output; and controlling one or more actuators of the mobile robot based on the corresponding low-level action output to cause the mobile robot to implement the corresponding low-level action. The corresponding low-level action output defines a corresponding low-level action of a defined low-level action space, and the defined low-level action space defines robot movement more granularly than does the high-level action space.

These and other implementations can include one or more of the following features. The discrete high-level actions of the defined high-level action space can lack any definition of one or more parameters, of the robot movement, that are defined in the low-level action space. The discrete high-level actions of the defined high-level action space can lack definition of any velocities, for the robot movement, and the low-level action space can define one or more velocities for the robot movement. The low-level action space can be a continuous action space. Each of the corresponding low-level actions can define one or more corresponding linear velocities and/or one or more corresponding angular velocities. For example, the mobile robot can include a first wheel and each of the corresponding low-level actions can define at least a corresponding linear velocity, of the one or more corresponding linear velocities, for the first wheel. The sensor component can be a camera and/or the additional sensor component can be a proximity sensor, a one-dimensional (1D) LIDAR component, or a two-dimensional (2D) LIDAR component. The sensor component can be a camera, each of the corresponding current outputs can be a corresponding current image, and each of the corresponding current observation data can be a corresponding embedding, of the corresponding current image, that is generated by processing the current image using an image embedding model. In generating each of the corresponding high-level action outputs, the corresponding additional observation data can also be processed, along with the corresponding current observation data and the target label, using the trained high-level policy model. In generating each of the corresponding low-level action outputs, the corresponding current observation data may not be processed using the trained low-level policy model. The trained high-level policy model can be a recurrent neural network (RNN) model and/or can be trained utilizing supervised learning. The trained low-level policy model can be trained using reinforcement learning. For example, the trained low-level policy model can be trained utilizing reward signals generated based on output from a robot simulator that simulates navigation of a simulated robot in a simulated environment. In generating each of the corresponding low-level action outputs, the corresponding current additional observation data from one or more immediately preceding of the iterations can also be processed along with the corresponding current additional observation data. The target label can include a one-hot vector with a one-hot value assigned based on a location of the navigation target in the environment, a classification of an object, or an embedding of an image of the object. At each of the plurality of iterations, the method can further include: determining that the corresponding particular high-level action is one that is capable of resulting in collision; and processing the corresponding current additional observation data, and the corresponding particular high-level action, using the trained low-level policy model to generate corresponding low-level action output, can be performed responsive to determining that the particular high-level action is one that is capable of resulting in collision.

In some implementations, a method of navigating a mobile robot in an environment is provided and includes identifying a target label for a navigation target in the environment, and navigating the mobile robot to the navigation target. Navigating the mobile robot to the navigation target include, at each of every iteration during navigation to the navigation target: obtaining corresponding current observation data that is based on corresponding current output from a sensor component of the mobile robot; processing the corresponding current observation data, and the target label, using a trained high-level policy model to generate a corresponding high-level action output; using the corresponding high-level action output to select a corresponding particular high-level action from a plurality of discrete high-level actions of a defined high-level action space; determining whether the corresponding particular high-level action is one that is capable of resulting in collision; when it is determined the corresponding particular high-level action is not one that is capable of resulting in collision: controlling one or more actuators of the mobile robot based on a corresponding default low-level action defined for the corresponding particular high-level action; and when it is determined the corresponding particular high-level action is one that is capable of resulting in collision: using a trained low-level policy model to generate corresponding low-level action output that is based on the high-level action and that is optimized, according to the low-level policy model, to reach the navigation target most quickly and without collision.

In some implementations, a method of training a high-level policy model and a low-level policy model for cooperative use in automated navigation, of a mobile robot, is provided. The method includes performing supervised training of the high-level policy model to train the high-level policy model to generate, based on processing corresponding observation data and a corresponding target label for a corresponding navigation target in an environment, corresponding high-level action output that indicates which of a plurality of discrete high-level actions will result in movement that is most proximal to the corresponding navigation target. Performing the supervised training includes: using real images captured throughout a real environment as part of the input to be processed by the high-level policy model during the supervised training; and generating losses during the supervised training using, as a supervision signal, ground truth navigation paths in the real environment. The method further includes performing reinforcement training of the low-level policy model to train the low-level policy model to generate, based on processing corresponding additional observation data and a corresponding high-level action, corresponding low-level action output that indicates a particular implementation of the high-level action that is defined more granularly than the high-level action. Performing the reinforcement training includes: using simulated data, generated by a robot simulator, in generating rewards based on a reward function; and using the rewards to update the low-level policy model. The reward function penalizes robot collision, while optionally rewarding faster speeds and/or shorter distances in reaching navigation targets.

What is claimed is:

1. A method of navigating a mobile robot in an environment, the method comprising:
identifying a target label for a navigation target in the environment;
navigating the mobile robot to the navigation target, navigating the mobile robot to the navigation target comprising, at each of a plurality of iterations during the navigation to the navigation target:
obtaining corresponding current observation data that is based on corresponding current output from a sensor component of the mobile robot;
obtaining corresponding current additional observation data that is based on corresponding current additional output from an additional sensor component of the mobile robot;

processing the corresponding current observation data, and the target label, using a trained high-level policy model to generate a corresponding high-level action output,
  wherein in generating each of the corresponding high-level action outputs, the corresponding additional observation data is also processed, along with the corresponding current observation data and the target label, using the trained high-level policy model;
using the corresponding high-level action output to select a corresponding particular high-level action from a plurality of discrete high-level actions of a defined high-level action space;
processing the corresponding current additional observation data, and the corresponding particular high-level action, using a trained low-level policy model to generate corresponding low-level action output,
  wherein the corresponding low-level action output defines a corresponding low-level action of a defined low-level action space,
  wherein in generating each of the corresponding low-level action outputs, the corresponding current observation data is not processed using the trained low-level policy model, and
  wherein the defined low-level action space defines robot movement more granularly than does the high-level action space; and
controlling one or more actuators of the mobile robot based on the corresponding low-level action output to cause the mobile robot to implement the corresponding low-level action.

2. The method of claim 1, wherein the discrete high-level actions of the defined high-level action space lack any definition of one or more parameters, of the robot movement, that are defined in the low-level action space.

3. The method of claim 1, wherein the discrete high-level actions of the defined high-level action space lack definition of any velocities, for the robot movement, and the low-level action space defines one or more velocities for the robot movement.

4. The method of claim 1, wherein the low-level action space is a continuous action space.

5. The method of claim 1, wherein each of the corresponding low-level actions defines one or both of: one or more corresponding linear velocities and one or more corresponding angular velocities.

6. The method of claim 5, wherein the mobile robot includes a first wheel and wherein each of the corresponding low-level actions defines at least a corresponding linear velocity, of the one or more corresponding linear velocities, for the first wheel.

7. The method of claim 1, wherein the sensor component is a camera.

8. The method of claim 1, wherein the additional sensor component is a proximity sensor, a one-dimensional (1D) LIDAR component, or a two-dimensional (2D) LIDAR component.

9. The method of claim 1, wherein the sensor component is a camera, each of the corresponding current outputs is a corresponding current image, and each of the corresponding current observation data is a corresponding embedding, of the corresponding current image, that is generated by processing the current image using an image embedding model.

10. The method of claim 1, wherein the trained high-level policy model is a recurrent neural network (RNN) model.

11. The method of claim 1, wherein the trained low-level policy model is trained using reinforcement learning or is trained utilizing supervised learning.

12. The method of claim 11, wherein the trained low-level policy model is trained utilizing reward signals generated based on output from a robot simulator that simulates navigation of a simulated robot in a simulated environment.

13. The method of claim 1, wherein in generating each of the corresponding low-level action outputs, the corresponding current additional observation data from one or more immediately preceding of the iterations is also processed along with the corresponding current additional observation data.

14. The method of claim 1, wherein the target label is a one-hot vector, and wherein a one-hot value of the one-hot vector is assigned based on a location of the navigation target in the environment.

15. The method of claim 1, wherein the navigation target is an object and wherein the target label is a classification of the object or an embedding of an image of the object.

16. The method of claim 1, further comprising, at each of the plurality of iterations:
  determining that the corresponding particular high-level action is one that is capable of resulting in collision;
  wherein processing the corresponding current additional observation data, and the corresponding particular high-level action, using the trained low-level policy model to generate corresponding low-level action output, is performed responsive to determining that the particular high-level action is one that is capable of resulting in collision.

17. A method of navigating a mobile robot in an environment, the method comprising:
  identifying a target label for a navigation target in the environment;
  navigating the mobile robot to the navigation target, navigating the mobile robot to the navigation target comprising, at each of every iteration during navigation to the navigation target:
    obtaining corresponding current observation data that is based on corresponding current output from a sensor component of the mobile robot, wherein the corresponding current output from the sensor component is a first type of observation;
    processing the corresponding current observation data, and the target label, using a trained high-level policy model to generate a corresponding high-level action output;
    using the corresponding high-level action output to select a corresponding particular high-level action from a plurality of discrete high-level actions of a defined high-level action space;
    determining whether the corresponding particular high-level action is one that is capable of resulting in collision;
    when it is determined the corresponding particular high-level action is not one that is capable of resulting in collision:
      controlling one or more actuators of the mobile robot based on a corresponding default low-level action defined for the corresponding particular high-level action;
    when it is determined the corresponding particular high-level action is one that is capable of resulting in collision:
      using a trained low-level policy model to generate, based on processing current additional observation data and the high-level action, corresponding low-level action output that is based on the high-level action and that is optimized, according to the low-level policy model, wherein using the trained low-level policy model to generate the corresponding low-level action output is without utilizing any observations that are of the first type of observation, and wherein the current additional observation data is based on corresponding current additional output from an additional sensor component of the mobile robot, wherein the corresponding current additional output from the additional sensor component of the mobile robot is a second type of observation, wherein the second type of observation has a lower fidelity than does the first type of observation.

18. The method of claim 17, wherein the first type of observation is an image and the corresponding current output from the sensor component is a corresponding current image from a camera of the mobile robot, and wherein the second type of observation is a depth observation, and the corresponding current additional output from the additional sensor component is a corresponding current depth observation.

* * * * *